(12) United States Patent
Massey

(10) Patent No.: US 11,123,166 B2
(45) Date of Patent: Sep. 21, 2021

(54) DUAL HEAD DENTAL FLOSS PICK

(71) Applicant: Clint Massey, St. Louis, MO (US)

(72) Inventor: Clint Massey, St. Louis, MO (US)

( * ) Notice: Subject to any disclaimer, the term of this patent is extended or adjusted under 35 U.S.C. 154(b) by 288 days.

(21) Appl. No.: 16/507,290

(22) Filed: Jul. 10, 2019

(65) Prior Publication Data
US 2019/0328496 A1  Oct. 31, 2019

Related U.S. Application Data

(63) Continuation of application No. 29/686,018, filed on Apr. 2, 2019, now Pat. No. Des. 893,805.

(60) Provisional application No. 62/717,986, filed on Aug. 13, 2018.

(51) Int. Cl.
*A61C 15/04* (2006.01)

(52) U.S. Cl.
CPC .......... *A61C 15/046* (2013.01); *A61C 15/041* (2013.01)

(58) Field of Classification Search
CPC .... A61C 15/046; A61C 15/041; A61C 15/043
USPC ........................................................ 132/323
See application file for complete search history.

(56) References Cited

U.S. PATENT DOCUMENTS

| | | | | |
|---|---|---|---|---|
| 1,955,428 A * | 4/1934 | Ladwig | ................ | A61C 15/046 132/324 |
| 3,828,804 A * | 8/1974 | Ely | ...................... | A61C 15/046 132/323 |
| 3,908,677 A * | 9/1975 | Beach | .................. | A61C 15/046 132/325 |
| 4,105,120 A * | 8/1978 | Bradberry | .............. | A45D 44/18 206/581 |
| D251,075 S * | 2/1979 | Schiff | ......................... | 132/323 |
| D268,955 S * | 5/1983 | Givens | ........................ | 132/323 |
| 4,736,757 A * | 4/1988 | Badoux | ................ | A61C 15/046 132/323 |
| 4,827,952 A * | 5/1989 | Kos | ...................... | A61C 15/046 132/323 |
| 5,433,227 A * | 7/1995 | Chen | .................... | A61C 15/046 132/323 |
| 5,538,023 A * | 7/1996 | Oczkowski | .......... | A61C 15/046 132/323 |
| 5,692,531 A * | 12/1997 | Chodorow | ........... | A61C 15/046 132/323 |
| 5,704,379 A * | 1/1998 | Krynicki | .............. | A61C 15/046 132/323 |
| 5,829,458 A * | 11/1998 | Chodorow | ............. | A61C 15/02 132/323 |
| 6,065,479 A * | 5/2000 | Chodorow | ........... | A61C 15/046 132/323 |
| 6,092,536 A * | 7/2000 | Owens | ................. | A61C 15/046 132/323 |
| 6,748,958 B1 * | 6/2004 | Gwen | .................. | A61C 15/046 132/327 |

(Continued)

*Primary Examiner* — Nicholas D Lucchesi
(74) *Attorney, Agent, or Firm* — Boudwin Intellectual Property; Daniel Boudwin

(57) ABSTRACT

A dual head dental floss pick. The dual head dental floss pick includes a body having a first end opposite a second end, wherein a pair of arms extend orthogonally from the body. A length of floss extends between a distal end of each of the pair of arms and the second end of the body, wherein the first end tapers to terminate in a scraping edge. In some embodiments, a pair of supports extend between the body and the pair of arms to provide additional support thereto.

13 Claims, 2 Drawing Sheets

(56) References Cited

U.S. PATENT DOCUMENTS

| | | | |
|---|---|---|---|
| 6,752,158 B1* | 6/2004 | Gwen | A61C 15/046 132/327 |
| 8,069,865 B1 | 12/2011 | Winter | |
| 9,717,575 B2 | 8/2017 | Chodorow et al. | |
| 9,844,431 B2* | 12/2017 | Lam | A61C 15/046 |
| 2011/0073133 A1* | 3/2011 | Crossman | A61C 15/046 132/323 |
| 2012/0111348 A1 | 5/2012 | Prokopchuk et al. | |
| 2014/0326274 A1 | 11/2014 | Kollar et al. | |
| 2016/0067021 A1* | 3/2016 | Zwimpfer | A61C 15/02 132/323 |
| 2016/0278894 A1 | 9/2016 | Xu | |
| 2020/0383693 A1* | 12/2020 | Jun | A61C 15/046 |
| 2020/0383694 A1* | 12/2020 | Jun | A61B 17/244 |

* cited by examiner

DUAL HEAD DENTAL FLOSS PICK

CROSS REFERENCE TO RELATED APPLICATIONS

This application claims the benefit of U.S. Provisional Application No. 62/717,986 filed on Aug. 13, 2018 as well as U.S. Design patent application Ser. No. 29/686,018 filed on Apr. 2, 2019. The above identified patent applications are herein incorporated by reference in their entirety to provide continuity of disclosure.

BACKGROUND OF THE INVENTION

The present invention relates to dental floss picks. More particularly, the present invention pertains to dental floss picks having dual heads for simultaneously flossing upper and lower sets of teeth.

Many people floss their teeth to properly maintain oral hygiene. Plaque and other debris can build up within the interstitial space between adjacent teeth, especially along the gumline, and must subsequently be removed to ensure the teeth do not decay or suffer other maladies, such as gum disease, abscesses, ulcers, and the like. Without proper oral hygiene, teeth can be lost over time, leading to expensive and invasive treatment, such as dental implants or dentures. Traditional dental floss can be difficult to utilize, however, as a user must individually separate a length of floss from a container while continually adjusting the length of floss to present a fresh segment to use for each interstitial space. Additionally, flossing can be time consuming and frustrating. Therefore, a device that can expedite the flossing process and efficiently clean the interstitial space between adjacent teeth is desired.

In light of the devices disclosed in the known art, it is submitted that the present invention substantially diverges in design elements from the known art and consequently it is clear that there is a need in the art for an improvement to existing dental floss picks. In this regard, the instant invention substantially fulfills these needs.

SUMMARY OF THE INVENTION

In view of the foregoing disadvantages inherent in the known types of dental floss picks now present in the known art, the present invention provides a dual head dental floss pick wherein the same can be utilized for providing convenience for the user when simultaneously flossing between both upper teeth and lower teeth.

The present system comprises a body having a first end opposite a second end, wherein a pair of arms extend orthogonally from the body. A length of floss extends between a distal end of each of the pair of arms and the second end of the body and wherein the first end tapers to terminate in a scraping edge. In some embodiments, a pair of supports extend between the distal end of the pair of arms and the body configured to provide additional support to the pair of arms. In another embodiment, a channel is disposed in the distal end of each of the pair of arms and in the second end, wherein the channel is configured to removably secure the length of floss therein. In other embodiments, an opening extends through a central portion of the body. In yet another embodiment, the second end comprises a pair of protrusions thereon, such that the length of floss extends between each of the pair of protrusions and each of the distal ends of the pair of arms. In some embodiments, the pair of arms are configured to selectively move between a resting position and a compressed position, wherein a linear distance between the distal end and the second end is greater when the pair of arms are in the compressed position. In another embodiment, the body and the length of floss are coplanar. In other embodiments, the pair of supports are configured to flex into an arcuate shape when the pair of arms are in the compressed position.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
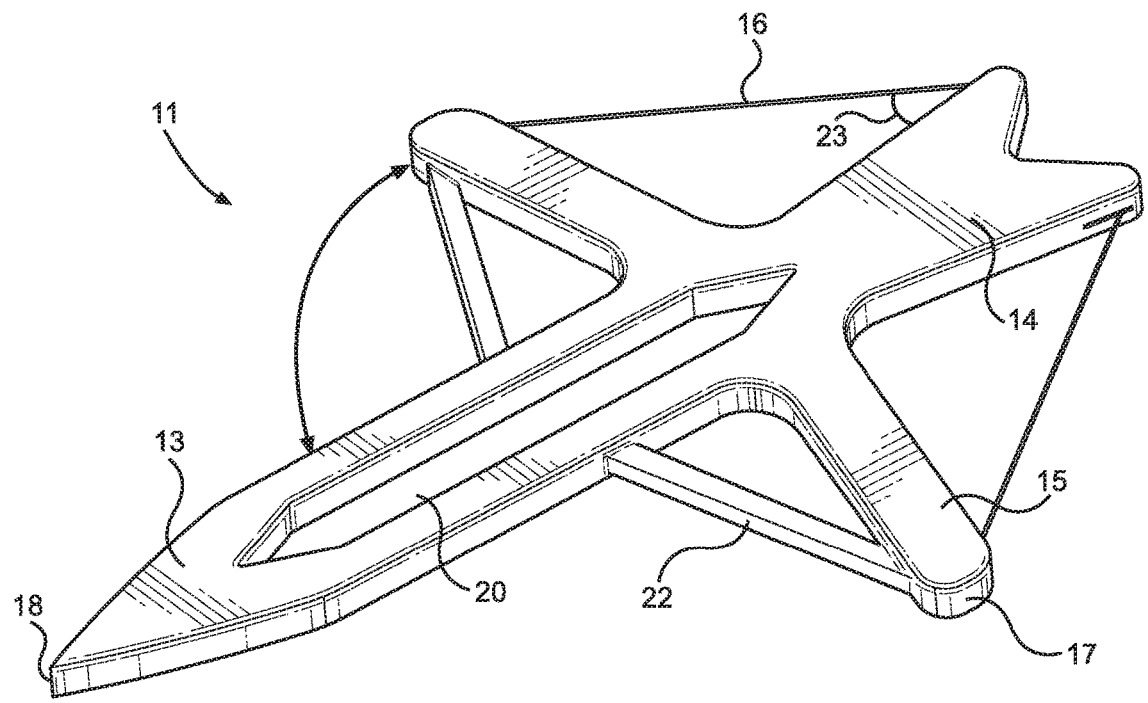
FIG. 1A shows a perspective view of an embodiment of the dual head dental floss pick in the resting position.

Reference is made herein to the attached drawings. Like reference numerals are used throughout the drawings to depict like or similar elements of the dual head dental floss pick. The figures are intended for representative purposes only and should not be considered to be limiting in any respect.

Figure 1B:
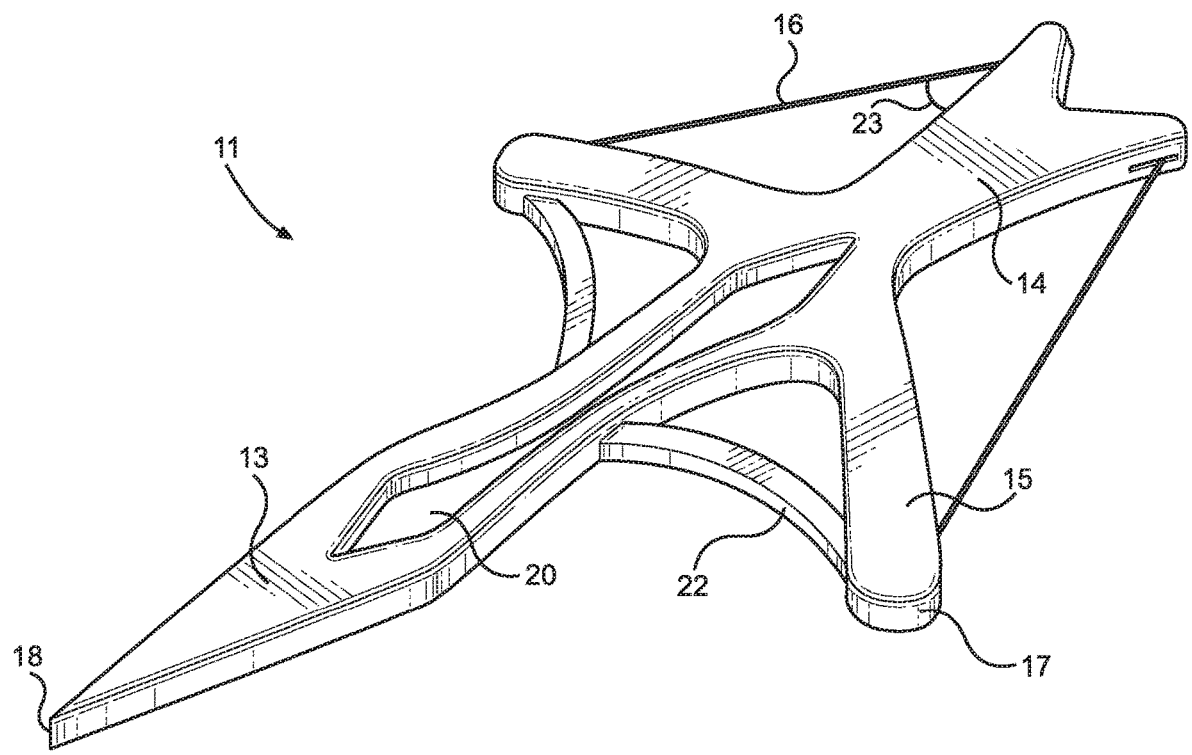
FIG. 1B shows a perspective view of an embodiment of the dual head dental floss pick in the compressed position.

Referring now to FIGS. 1A and 1B, there is shown a perspective view of an embodiment of the dual head dental floss pick in the resting position and a perspective view of an embodiment of the dual head dental floss pick in the compressed position, respectively. The dual head dental floss pick 11 comprises a body 12 having a first end 13 opposite a second end 14. A pair of arms 15 extend orthogonally from the body 12, wherein each of the pair of arms 15 includes a distal end 17. A length of floss 16 extends between the distal end 17 of each arm and the second end 14. In the shown embodiment, the pair of arms 15, the body 12, and the length of floss 16 are all coplanar. In the illustrated embodiment, the length of floss 16 is angled at a desired angle 23, such that the user can efficiently utilize the length of floss 16 to remove plaque and debris from an interstitial space between adjacent teeth.

The first end 13 tapers to form a scraping edge 18. In the illustrated embodiment, the scraping edge 18 comprises a linear edge configured to rest flush against an outer surface of a user's tooth, thereby enabling a user to scrape plaque buildup from the outer surface. In this way, the dual head dental floss pick 11 provides additional oral hygiene options, allowing a user to approximate the effects of brushing one's teeth.

In some embodiments, the pair of arms 15 are further configured to selectively move between a compressed position and a relaxed position, wherein a linear distance between the distal end 17 of each of the pair of arms 15 is greater when the pair of arms 15 are in the compressed position. In this way, the user can adjust the tension on the length of floss 16 in order to provide a desired tension for the present flossing need. For example, over time, the length of floss 16 may lose tension as the length of floss 16 suffers wear and tear from use. In this situation, a user may selectively move the pair of arms 15 towards the compressed position, increasing the tension within the length of floss 16 to provide optimal resistance when removing debris from the interstitial space. Furthermore, by manipulating the pair of arms 15 between the relaxed position and the compressed position, the user is able to manually adjust the angle 23 of the length of floss 16 relative to the second end 14. In this way, the user can position the length of floss 16 to most effectively remove debris from the interstitial space. This can be particularly useful when simultaneously flossing both the upper set of teeth and the lower set of teeth with each opposing length of floss 16, as many individuals' teeth are not perfectly aligned. In such cases, while the length of floss 16 may be angled appropriately for one set of teeth, the opposite length of floss 16 may be inappropriately positioned to reach the entirety of the interstitial space. In the illustrated embodiment, the body 12 further comprises an opening 20 therethrough, wherein the opening 20 is configured to allow the body 12 to flex inwardly when the pair of arms 15 are manipulated, as shown in FIG. 1B. Further, in the shown embodiment, the opening 20 tapers at opposing ends thereof, such that the body 12 can flex more readily inward about the opposing ends of the opening 20. The opening 20 further reduces cost of manufacture as less material is necessary to produce the body 12.

In the illustrated embodiment, the dual head dental floss pick 11 further comprises a pair of supports 22 extending between the distal end 17 of each of the pair of arms 15 and the body 12, wherein the pair of supports 22 are configured to provide additional stability to the pair of arms 15. In this way, the pair of supports 22 can prevent unintentional breakage of the pair of arms 15 during use or storage. Furthermore, in some embodiments, the pair of supports 22 are flexible, such that the pair of supports 22 spring bias the pair of arms 15 towards the relaxed position. In this way, when the user selectively moves the pair of arms 15 towards the compressed position to adjust the position or tension of the length of floss 16, the pair of arms 15 return to the relaxed position when released by the user. As shown in the embodiment of FIG. 1B, the pair of supports 22 are configured to flex into an arcuate shape when the pair of arms 15 are in the compressed position.

Figure 2:
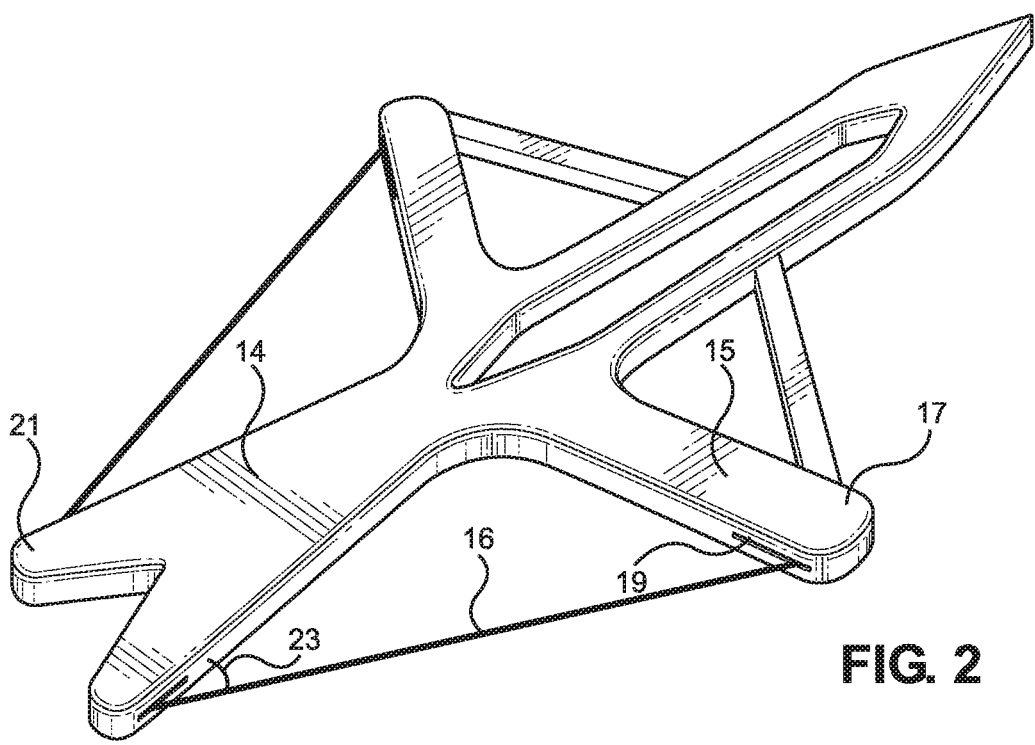
FIG. 2 shows a close-up view of the first end of an embodiment of the dual head dental floss pick.

Referring now to FIG. 2, there is shown a close-up view of the first end of an embodiment of the dual head dental floss pick. In the illustrated embodiment, the second end 14 further comprises a pair of protrusions 21 thereon, wherein the pair of protrusions 21 extend away from a central axis of the body to angle the length of floss 16 at a desired angle. Furthermore, the pair of protrusions 21 form a void space therebetween, wherein the void space can receive a user's tongue therein during use, allowing a user to more precisely control the second end 14 during use.

In some embodiments, a channel 19 is disposed in the distal end 17 of each of the pair of arms 15 as well as within the second end 14. In the illustrated embodiment, the channel 19 within the second end 14 comprises separate channels 19 in each of the pair of protrusions 21. The channels 19 are configured to secure the length of floss 16 therein. While the dual head dental floss pick is also contemplated to be a disposable device, in some embodiments, the length of floss 16 is removably securable within the channels 19, such that the user can replace a used length of floss 16 with a new length of floss 16 when desired. Furthermore, in some embodiments, the length of floss 16 can be positioned along the channels 19 to further adjust the desired angle 23 thereof.

Figure 3:
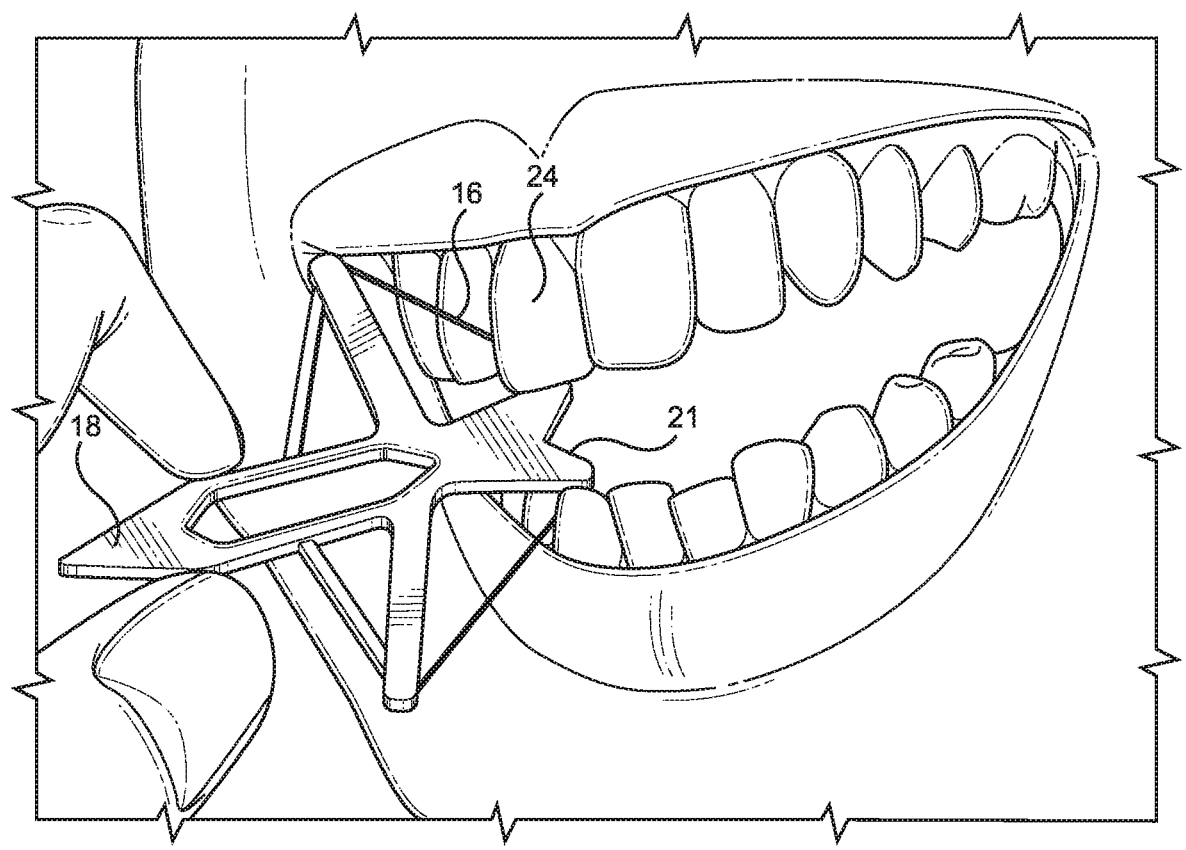
FIG. 3 shows a perspective view of an embodiment of the dual head dental floss pick in use.

Referring now to FIG. 3, there is shown a perspective view of an embodiment of the dual head dental floss pick in use. In one exemplary use, the user grips the dual head dental floss pick along the first end and positions the length of floss 16 between a pair of adjacent teeth 24. The user can further align an opposing length of floss 16 between a pair of adjacent teeth 24 opposite the first pair of teeth 24, such that the user can simultaneously floss the upper set of teeth 24 and the lower set of teeth 24. Should the user desire more tension within the length of floss 16, the user can grip the pair of arms to move the pair of arms to the compressed position, thereby tightening the length of floss 16. Additionally, this movement can adjust the angle of the length of floss 16 to more effectively reach a desired space within the interstitial space between adjacent teeth 24. A user can further place their tongue between the pair of protrusions 21 disposed on the second end, such that the user's tongue can provide additional precision. Should the user desire to clean the outer surface of the teeth 24, the user can reverse the dual head dental floss pick and utilize the scraping edge 18. The scraping edge 18 can be placed flush against the outer surface of the teeth 24 and then pulled thereacross to remove plaque buildup or debris therefrom.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dual head dental floss pick, comprising:
    a body having a first end opposite a second end;
    a pair of arms extending orthogonally from the body;
    wherein a length of floss extends between a distal end of each of the pair of arms and the second end of the body;
    wherein the pair of arms are configured to selectively move between a resting position and a compressed position;
    wherein a linear distance between each distal end and the second end is greater when the pair of arms are in the compressed position than that of the resting position; and
    wherein the first end tapers to terminate in a scraping edge.

2. The dual head dental floss pick of claim 1, further comprising a channel disposed in the distal end of each of the pair of arms and in the second end, wherein each channel is configured to removably secure the length of floss therein.

3. The dual head dental floss pick of claim 1, further comprising an opening extending through a central portion of the body.

4. The dual head dental floss pick of claim 1, wherein the second end comprises a pair of protrusions, such that the length of floss extends between each of the pair of protrusions and each of the distal ends of the pair of arms.

5. The dual head dental floss pick of claim 1, wherein the body and the length of floss are coplanar.

6. The dual head dental floss pick of claim 1, wherein the body comprises a unitary construction.

7. A dual head dental floss pick, comprising:
a body having a first end opposite a second end;
a pair of arms extending orthogonally from the body;
a pair of supports extending between the body and the pair of arms;
wherein a length of floss extends between a distal end of each of the pair of arms and the second end of the body;
wherein the pair of arms are configured to selectively move between a resting position and a compressed position;
wherein a linear distance between each distal end and the second end is greater when the pair of arms are in the compressed position than that of the resting position;
wherein the first end tapers to terminate in a scraping end.

8. The dual head dental floss pick of claim 7, further comprising a channel disposed in the distal end of each of the pair of arms and in the second end, wherein each channel is configured to removably secure the length of floss therein.

9. The dual head dental floss pick of claim 7, further comprising an opening extending through a central portion of the body.

10. The dual head dental floss pick of claim 7, wherein the second end comprises a pair of protrusions, such that the length of floss extends between each of the pair of protrusions and each of the distal ends of the pair of arms.

11. The dual head dental floss pick of claim 7, wherein the body and the length of floss are coplanar.

12. The dual head dental floss pick of claim 7, wherein the pair of support are configured to flex into an arcuate shape when the pair of arms are in the compressed position.

13. The dual head dental floss pick of claim 7, wherein the body comprises a unitary construction.

\* \* \* \* \*